United States Patent
Wang et al.

(10) Patent No.: US 8,620,912 B2
(45) Date of Patent: Dec. 31, 2013

(54) RANKING ADVERTISEMENT(S) BASED UPON ADVERTISEMENT FEATURE(S)

(75) Inventors: Xin-Jing Wang, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 12/816,533

(22) Filed: Jun. 16, 2010

(65) Prior Publication Data

US 2011/0314013 A1 Dec. 22, 2011

(51) Int. Cl.
 G06F 7/00 (2006.01)
 G06F 17/30 (2006.01)
(52) U.S. Cl.
 USPC .......................................................... 707/731
(58) Field of Classification Search
 None
 See application file for complete search history.

(56) References Cited

U.S. PATENT DOCUMENTS

| | | | |
|---|---|---|---|
| 2005/0004897 A1* | 1/2005 | Lipson et al. ...................... | 707/3 |
| 2007/0130203 A1 | 6/2007 | Gulli et al. | |
| 2007/0162428 A1* | 7/2007 | Williams et al. ................... | 707/3 |
| 2008/0005668 A1 | 1/2008 | Mavinkurve et al. | |
| 2008/0021710 A1 | 1/2008 | Ho | |
| 2008/0162437 A1 | 7/2008 | Choi et al. | |
| 2008/0242279 A1 | 10/2008 | Ramer et al. | |
| 2008/0319844 A1 | 12/2008 | Hua et al. | |
| 2009/0006189 A1 | 1/2009 | Zhang et al. | |
| 2009/0125372 A1* | 5/2009 | van Zwol et al. ............... | 705/10 |
| 2009/0125510 A1* | 5/2009 | Graham et al. .................... | 707/5 |
| 2009/0241065 A1* | 9/2009 | Costello ........................ | 715/843 |

OTHER PUBLICATIONS

Wang, et al., "Argo: Intelligent Advertising by Mining a User's Interest from His Photo Collections", Retrieved at <<http://research.microsoft.com/en-us/people/xjwang/argo_wangyuzhang_.pdf >>, International Conference on Knowledge Discovery and Data Mining, Proceedings of the Third International Workshop on Data Mining and Audience Intelligence for Advertising, Jun. 28, 2009, pp. 9.

Blei, et al., "Modeling Annotated Data", Retrieved at <<http://www.cs.princeton.edu/~blei/papers/BleiJordan2003.pdf>>, Annual ACM Conference on Research and Development in Information Retrieval, Proceedings of the 26th annual international ACM SIGIR conference on Research and development in informaion retrieval, Jul. 28-Aug. 1, 2003, pp. 8.

"eMarketer", Retrieved at <<http://www.emarketer.com/ >>, Retrieved Date: Apr. 19, 2010, p. 1.

(Continued)

*Primary Examiner* — Uyen Le
(74) *Attorney, Agent, or Firm* — Microsoft Corporation

(57) ABSTRACT

While browsing, a user may interact with a wide variety of images. The user may upload and share images taken with a digital camera and/or search for image using a search engine. Because images are rich in contextual information, it may be advantageous to provide additional information, such as adjacent market advertising based upon matching advertisements with contextual information of the images. Accordingly, a query image may be used to retrieve a video frame set. The video frame set may be expanded with related video frames corresponding to adjacent markets. The expanded video frame set may be grouped into clusters of similar frames. The clusters may be used to rank advertisements based upon how similar the advertisements are to the clusters and/or video frames within the clusters. In this way, one or more ranked advertisements may be presented with the query image.

20 Claims, 13 Drawing Sheets

(56) References Cited

OTHER PUBLICATIONS

Ghahramani, et al., "Bayesian Sets", Retrieved at <<http://www.gatsby.ucl.ac.uk/~heller/bsets.pdf >>, Advances in Neural Information Processing Systems 18, NIPS, Dec. 5-8, 2005, pp. 8.

Ghose, et al., "Analyzing Search Engine Advertising: Firm Behavior and Cross-Selling in Electronic Markets", Retrieved at <<http://www2008.org/papers/pdf/p219-ghose.pdf >>, International World Wide Web Conference, Proceeding of the 17th international conference on World Wide Web, Apr. 21-25, 2008, pp. 219-226.

"Google AdWords", Retrieved at <<http://adwords.google.com/ >>, Retrieved Date: Apr. 19, 2010, p. 1.

"Google AdSense", Retrieved at <<http://www.google.com/adsense/ >>, Retrieved Date: Apr. 19, 2010, p. 1.

Li, et al., "Tag-based Social Interest Discovery", Retrieved at <<http://www2008.org/papers/pdf/p675-liA.pdf >>, International World Wide Web Conference, Proceeding of the 17th international conference on World Wide Web, Apr. 21-25, 2008, pp. 675-684.

Hua, et al., "When Multimedia Advertising Meets the New Internet Era", Retrieved at <<http://research.microsoft.com/ en-us/um/people/xshua/publications/pdf/2008_mmsp_makesenseinternetera.pdf>>, IEEE Workshop on Multimedia Signal Processing, 2008, pp. 5.

Joshi, et al., "Keyword Generation for Search Engine Advertising", Retrieved at <<http://citeseerx.ist.psu.edu/viewdoc/download?doi=10.1.1.86.9766&rep=rep1&type=pdf >>, ICDMW, Proceedings of the Sixth IEEE International Conference on Data Mining—Workshops, Dec. 18-22, 2006, pp. 5.

Lacerda, et al., "Learning to Advertise", Retrieved at <<http://citeseerx.ist.psu.edu/download?doi=10.1.1.89.9126&rep=rep1&type=pdf >>, Annual ACM Conference on Research and Development in Information Retrieval, Proceedings of the 29th annual international ACM SIGIR conference on Research and development in information retrieval, Aug. 6-11, 2006, pp. 8.

Lew, et al., "Content-Based Multimedia Information Retrieval: State of the Art and Challenges", Retrieved at <<http://www.liacs.nl/~mlew/mir.survey16b.pdf >>, ACM Transactions on Multimedia Computing, Communications and Applications (TOMCCAP), vol. 2, No. 1, Feb. 2006, pp. 26.

Liao, et al., "AdImage: Video Advertising by Image Matching and Ad Scheduling Optimization.", Retrieved at <<http:// delivery.acm.org/10.1145/1400000/1390494/p767-liao.pdf?key1=1390494&key2=9567761721&coll=GUIDE&dl=GUIDE&CFID=86833473& CFTOKEN=34645636 >>, Annual ACM Conference on Research and Development in Information Retrieval, Proceedings of the 31st annual international ACM SIGIR conference on Research and development in information retrieval, Jul. 20-24, 2008, pp. 767-768.

Mei, et al., "Contextual In-Image Advertising", Retrieved at <<http://portal.acm.org/ft_gateway.cfm?id=1390494&type=pdf&coll=GUIDE&dl=GUIDE&CFID=86833473& CFTOKEN=34645636 >>, International Multimedia Conference, Proceeding of the 16th ACM international conference on Multimedia, Oct. 26-31, 2008, pp. 439-448.

Mei, et al., "VideoSense—Towards Effective Online Video Advertising", Retrieved at <<http://research.microsoft.com/en-us/um/people/xshua/publications/pdf/2007_acmmm_videosense.pdf >>, International Multimedia Conference, Proceedings of the 15th international conference on Multimedia, MM'07, Sep. 23-28, 2007, pp. 10.

Murdock, et al., "A Noisy-Channel Approach to Contextual Advertising", Retrieved at <<http://research.yahoo.com/files/p21-murdock.pdf >>, International Conference on Knowledge Discovery and Data Mining, Proceedings of the 1st international workshop on Data mining and audience intelligence for advertising, Aug. 12, 2007, pp. 21-27.

"Online Publishers", Retrieved at <<http://www.online-publishers.com/ >>, Retrieved Date: Apr. 19, 2010, p. 1.

Ranganathan, Ananth., "The Dirichlet Process Mixture (DPM)", Retrieved at <<http://biocomp.bioen.uiuc.edu/journal_club_web/dirichletpdf >>, Sep. 20, 2004, pp. 1-6.

Ribeiro-Neto, et al., "Impedance Coupling in Content-Targeted Advertising", Retrieved at <<http://homepages.dcc.ufmg.br/~berthier/conference_papers/sigir_2005a.pdf >>, Annual ACM Conference on Research and Development in Information Retrieval, Proceedings of the 28th annual international ACM SIGIR conference on Research and development in information retrieval, Aug. 15-19, 2005, pp. 8.

Sande, et al., "Evaluating Color Descriptors for Object and Scene Recognition", Retrieved at <<http://staff.science.uva.nl/~ksande/pub/vandesande-cvpr2008.pdf >>, Computer Vision and Pattern Recognition, IEEE Computer Society Conference on in Computer Vision and Pattern Recognition, CVPR, IEEE Conference on, vol. 0, 2008, pp. 8.

Wang, et al., "Annotating Images by Mining Image Search Results", Retrieved at <<http://ieeexplore.ieee.org/stamp/stamp.jsp?tp=&arnumber=4527251 >>, IEEE Transactions on Pattern Analysis and Machine Intelligence, vol. 30, No. 11, Nov. 2008, pp. 1919-1932.

"Yahoo! Image", Retrieved at << http://images.search.yahoo.com/images >>, pp. 17.

Yakhnenko, et al., "Multi-Modal Hierarchical Dirichlet Process Model for Predicting Image Annotation and Image-Object Label Correspondence", Retrieved at << http://www.cs.iastate.edu/~honavar/Papers/SDM09-Oksana.pdf >>, Proceedings of the SIAM International Conference on Data Mining, SDM, Apr. 30-May 2, 2009, pp. 11.

D. Lowe, "Object Recognition from Local Scale-Invariant Features", Proc. of International Conference on Computer Vision, pp. 1150-1157, 1999.

\* cited by examiner

RANKING ADVERTISEMENT(S) BASED UPON ADVERTISEMENT FEATURE(S)

BACKGROUND

Many online users discover, share, and interact with images when exploring the internet. In one example, a user may upload photos from a mobile phone to a photo sharing website. In another example, a search engine may return images in response to a user submitting a query to the search engine for images relating to particular subject matter. It may be advantageous to leverage information associated with images to provide users with additional relevant information, such as advertisements. For example, an image returned by a search engine to a user may comprise additional information that may be extracted to determine related content that may appeal to the user. In this way, advertisements (potentially) relevant to the additional interests of the user may be provided as well. Unfortunately, current techniques provide advertisements based upon directly matching visual and textual features, but do not consider adjacent markets associated with the image. For example, an image may comprise an image of a mountain. If, however, the image does not contain visual or textual features relating to adjacent subject matter that the user may also be interested in, such as sport utility vehicles or mountaineering equipment, for example, then information regarding these adjacent markets may not be provided, potentially missing a targeted marketing opportunity.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for ranking ads (advertisements) based upon a query image are disclosed herein. In one example, a query image may be an image returned by a general purpose search engine in response to a search query by a user. In another example, a query image may be an image uploaded by a user of a social network. It may be appreciated that a query image may be any image or group of images, and is not limited to a single image or an image returned by a search engine. It may be appreciated that the query image may comprise visual and/or textual features associated with the query image (e.g., visual data and textual data within the query image, metadata describing the query image, surrounding text associated with the query image, etc.). The query image may be used to retrieve a video frame set. In particular, visual, textual, and/or other descriptive features of the query image may be used to retrieve video frames having similar features. For example, features of the query image may be matched with extracted features and/or annotation data of video frames within a large scale video frame database.

Because the video frame set may comprise video frames directly relevant to the query image, the video frame set may be expanded to comprise related video frames, which may correlate to adjacent market content. In this way, an expanded video frame set may comprise related video frames indicative of potential adjacent markets of the query image. In one example, a video frame within the video frame set may be used to determine related video frames. In particular, other video frames within a video comprising the video frame may be determined as related video frames.

The expanded video frame set may be grouped into one or more clusters. The one or more clusters may be defined based upon at least one of visual features and textual features extracted from the expanded video frame set. For example, a query image may be an image of a car, and a video frame set may comprise cars driving on a mountain trail, people eating in cars, car crashes, cars being loaded onto a plane for transportation, etc. The video frame set may be expanded with expanded video frames about cars, mountains, pizza, biscuits, tires, insurance companies, credit cards, planes, etc. Features, such as cars, vacations, food, etc. may be extracted from the expanded video frame set. The features may be used to define clusters, such as a food cluster, a car cluster, a scenery cluster, a tire cluster, an insurance package cluster, etc. In one example, a multimodal Dirichlet Process Mixture Sets model may be used to define clusters based upon the expanded video frame set. It may be appreciated that a topic may be assigned to a cluster based upon visual features and/or textual features of the cluster (features of video frames within the cluster).

Ads (e.g., advertisements) may be ranked based upon the one or more clusters. It may be appreciated that an ad database may comprise textual, video, audio, image, and/or other types of advertisements. If the ad database comprises video ads, then the ad database may comprise ad frames (keyframes) associated with the video ads. The ad frames of a video may be ranked using the one or more clusters, and the video may be ranked based upon the ranked ad frames of the video. In one example of ranking ads, a multimodal Dirichlet Process Mixture Sets model may be executed upon the ads using the one or more clusters. In one example, the ads may be ranked based upon a multimodal Dirichlet Process Mixture Sets model that may rank ads (e.g., textual ads, video ads, ad frames of video ads, image ads, etc.) based upon ads corresponding to (having similar features as) topics associated with the one or more clusters. In another example, the multimodal Dirichlet Process Mixture Sets model may rank the ads based upon ads corresponding to (having similar features as) extracted features of video frames within the one or more clusters. In another example, ad frames may be ranked based upon features of the ad frames corresponding to features of the one or more clusters. Ads (video ads) may be ranked based upon rankings of ad frames of the respective videos ads. One or more of the ranked ads may be presented.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
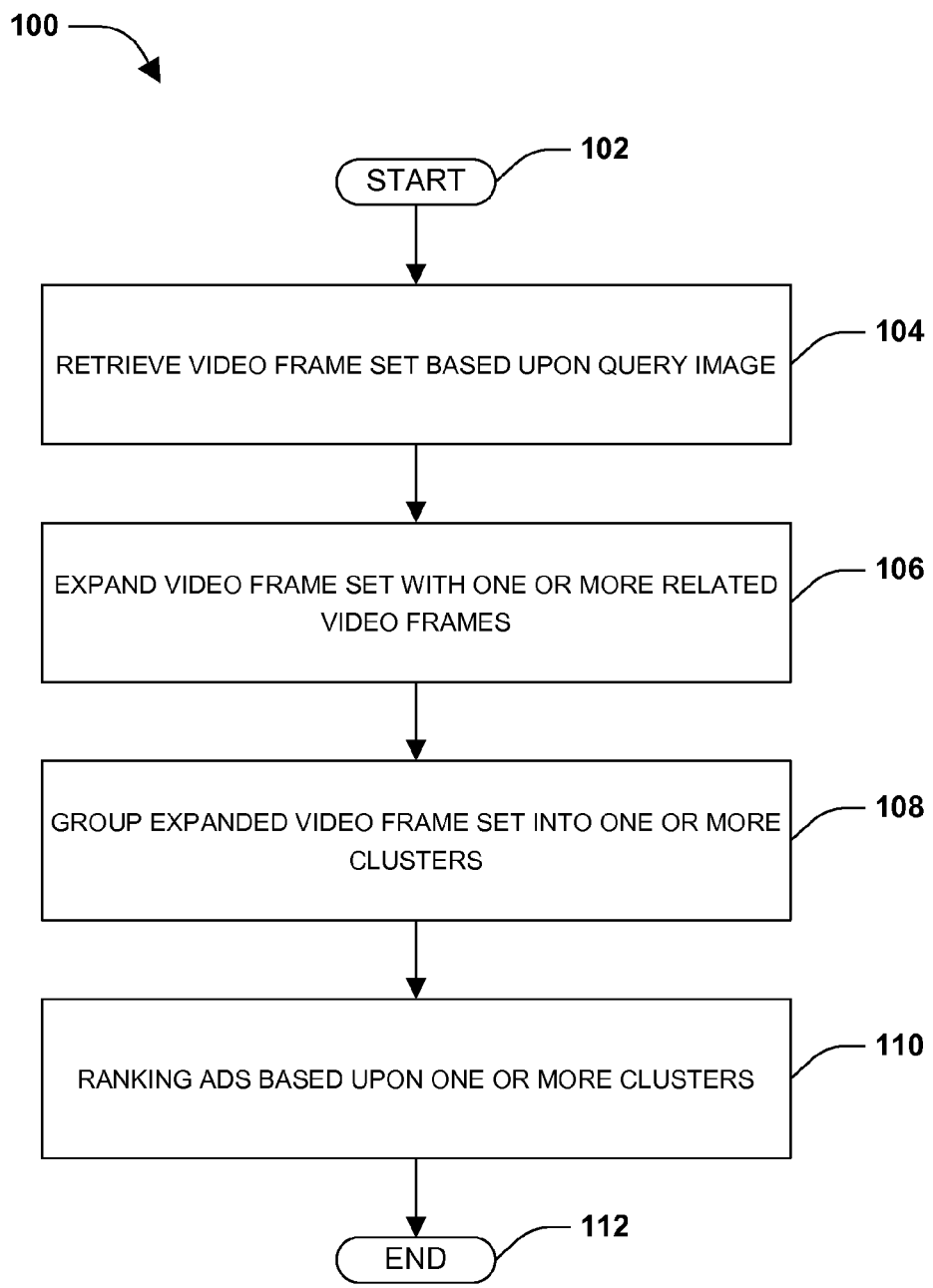
FIG. 1 is a flow chart illustrating an exemplary method of ranking ads.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many companies advertise products and promote ideas through Internet advertising. One goal of effective advertising is to provide users with advertisements that the user may find compelling and/or interesting. For example, advertisements relating to content with which a user is engaged may be provided in an attempt to provide products and/or ideas matching the user's interests. Current techniques may attempt to directly match content, such as a query image, with an advertisement. Unfortunately, directly matching a query image to an advertisement may fail to identify advertisements from adjacent markets. That is, current techniques may not adequately cross-sell products and ideas between markets having less than a direct correlation. In one example, a query image may comprise an image of pizza. Advertisements directly matching the pizza may include pizza pubs, frozen pizza products, and/or other advertisements directly relating to pizza. However, current techniques may not be able to determine adjacent markets, such as soft drink products, antacid products, roller skate products, and/or other advertisements from markets adjacent to the pizza market.

Accordingly, one or more systems and/or techniques for ranking ads are provided herein. In particular, query images and video frames may be leveraged to determine advertisements. The advertisements may relate to adjacent markets with respect to a query image. For example, a sports car query image may comprise a sports car made by Car Company. Current techniques may merely suggest advertisements for different models of cars made by Car Company based upon directly matching visual and textual features of the sports car query image. However, the techniques described herein may suggest advertisements of adjacent markets, such as tires, insurance companies, tourist resorts, etc.

One embodiment of ranking ads is illustrated by an exemplary method 100 in FIG. 1. At 102, the method begins. At 104, a video frame set may be retrieved based upon a query image. In one example, a query image may be one or more images associated with a database, a website, search engine results, and/or images from other sources. The query image may comprise features, such as visual features, textual features, and/or descriptive features. Features may be extracted from image data of the query image (e.g., colorsift data, sift, gist, color histogram, wavelet texture etc.), metadata of the query image, and/or surrounding content of the query image. It may be appreciated that a video frame set may comprise one or more video frames. In one example, a video frame may be a keyframe from a video. The keyframe may be annotated with close caption data and/or image auto-tagging data.

In one example of retrieving a video frame set, video frames visually and/or semantically similar to the query image may be extracted. That is, video frames having features similar to features of the query image may be retrieved, for example, from a large scale video frame database. In this way, video frames similar to the query image may be retrieved as the video frame set.

At 106, the video frame set may be expanded with one or more related video frames. In one example, a related video frame may be determined based upon the related video frame occurring within a video comprising a video frame within the video frame set. In another example, a related video frame may be determined based upon the related video frame having features similar to features of a video frame within the video frame set. It may be appreciated that video frames may be extracted as related video frames through a variety of techniques that may determine video frames relating to adjacent markets. In one illustrative example, a query image may comprise an image of a pizza. A video frame set comprising a pizza delivery car video frame and/or other video frames may be retrieved. A related video frame comprising a tire video frame may be determined. In one example, the tire video frame may be determined as a related video frame because the tire video frame and the pizza delivery car video frame may be comprised within the same video. In another example, the tire video frame may be determined as a related video frame because the tire video frame and the pizza delivery car video frame may have similar features. It may be appreciated that references to video frames within the expanded video frame set may be interpreted as both video frames and related video frames within the expanded video frame set.

At 108, the expanded video frame set (video frames/related video frames within the expanded video frame set) may be grouped into one or more clusters. Grouping the expanded video frame set into clusters may provide organization of video frames within the expanded video frame set based upon features extracted from the expanded video frame set. In particular, video frames having similar features may be grouped together. For example, video frames relating to restaurants may be grouped into a restaurant cluster.

The one or more clusters may be defined based upon visual, textual, and/or descriptive features of video frames within the expanded video frame set. For example, the expanded video frame set may comprise video frames relating to beaches, sea life, cars, nightlife, tools, romantic dinners, resorts, particular landmarks, etc. Visual, textual, and/or descriptive features of the video frames may be extracted. The extracted features may be used to define clusters. In one example, a multimodal Dirichlet Process Mixture Sets model may be used to define clusters based upon extracted features of the video frames. That is, the multimodal Dirichlet Process Mixture Sets model may be executed upon the expanded video frame set to define one or more cluster. The multimodal Dirichlet Process Mixture Sets model may be used to group video frames having similar features into corresponding clusters. For example, a restaurant cluster may be defined based upon at least some video frames relating to restaurants or food. That is, a sufficient number of video frames may relate to restaurants, thus a cluster may be defined for restaurant, such that video frames relating to restaurants may be grouped into the restaurant cluster. In this way, the video frames within the expanded video frame set may be grouped into the corresponding clusters. For example, video frames having features relating to vacations may be grouped into a vacation cluster.

It may be appreciated that a topic may be assigned to a cluster. That is, the topic may describe a commonality between video frames within a cluster. In one example, a topic may be a category of a cluster derived from visual, textual, and/or descriptive features of video frames within the cluster.

At 110, ads may be ranked based upon the one or more clusters. In particular, an ad may be ranked based upon at least some of the ad corresponding to topics assigned to the one or more clusters and/or extracted features of video frames within the one or more clusters. In one example, a multimodal Dirichlet Process Mixture Sets model may be executed upon the ads using the one or more clusters to rank ads. In particular, ads having features similar to topics assigned to the one or more cluster and/or features similar to features of video frames within the clusters may be ranked higher than ads lacking features similar to the clusters and/or video frames.

In one example, an ad may be a video advertisement. One or more ad frames of the video advertisement may be ranked based upon features of the ad frames corresponding to features of the one or more clusters. In this way, the video advertisement may be ranked based upon rankings of ad frames of the video advertisement. One or more of the ranked ads may be presented. For example, a video ad for tires and a textual ad for car insurance may be presented. At 112, the method ends.

Figure 2:
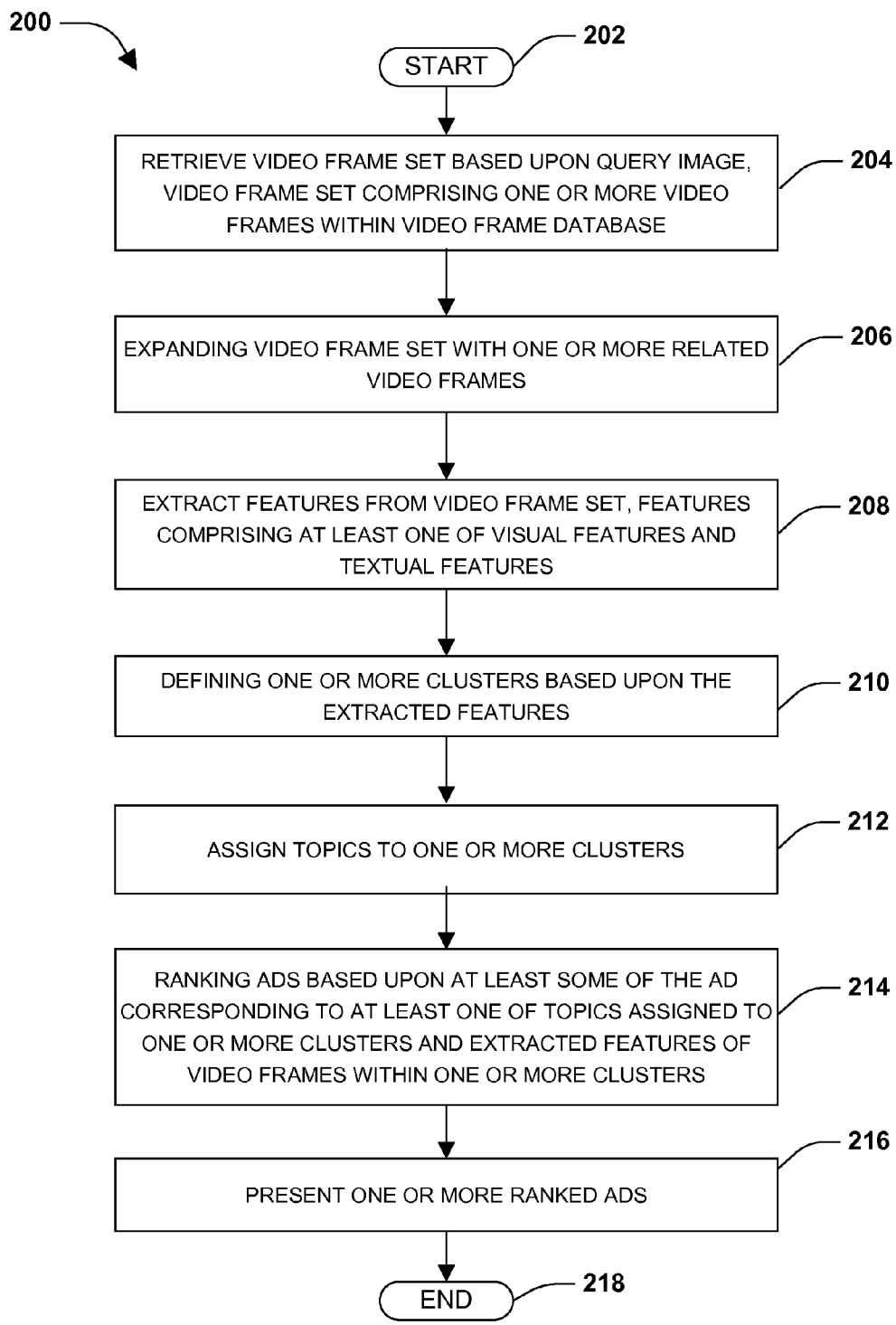
FIG. 2 is a flow chart illustrating an exemplary method of presenting ranked ads corresponding to a query image.

One embodiment of presenting ranked ads corresponding to a query image is illustrated by an exemplary method 200 in FIG. 2. At 202, the method begins. It may be appreciated that a large scale video frame database may comprise one or more video frames. A video frame may have features, such as visual features derived from image tagging techniques, textual features derived from close caption techniques and surrounding text, and/or other features describing the video frame. In one example, a video frame may be annotated based upon the features of the video frame. This allows for features of a video frame to be compared with features of other data, such as query images.

At 204, a video frame set may be retrieved based upon a query image. The video frame set may comprise one or more video frames of a video frame database. For example, video frames have visually and/or textually similar features as the query image may be retrieved. At 206, the video frame set may be expanded with one or more related video frames. For example, related video frames contextually associated with video frames within the video frame set (e.g., video frames within the same video) may be added into the video frame set. At 208, visual features (e.g., a visual sift descriptors, a determination that water is depicted within a video frame, a determination that a building is depicted within a video frame, etc.), textual features (e.g., annotated data of a video frame, close caption data, etc.), and/or descriptive features may be extracted from the video frame set.

At 210, one or more clusters may be defined based upon the extracted features. For example, a feature of car tires may be extracted from the video frame set (e.g., multiple video frames may comprise car tire features). In this way, a cluster for car tires may be defined. At 212, a topic may be assigned to the one or more clusters. For example, a cluster defined for car tires may be assigned a car tire topic. It may be appreciated that features of ads may be compared with topics of clusters to determine whether ads correlate to clusters and/or video frames within clusters.

At 214, an ad (e.g., a textual advertisement, a video advertisement, an audio advertisement, an image advertisement, etc.) may be ranked based upon at least some of the ad corresponding to topics assigned to the one or more clusters and/or extracted features of video frames within the one or more clusters. In one example, a multimodal Dirichlet Process Mixture Sets model may be executed upon the ad using the one or more clusters. In particular, ads having features similar to topics assigned to the one or more clusters and/or features similar to features of video frames within the clusters may be ranked higher than ads lacking features similar to the clusters and/or video frames. At 216, one or more ranked ads may be presented. For example, a predetermined number of ads having a predetermined rank threshold may be presented, while other lower ranked ads are not. At 218, the method ends.

Figure 3:
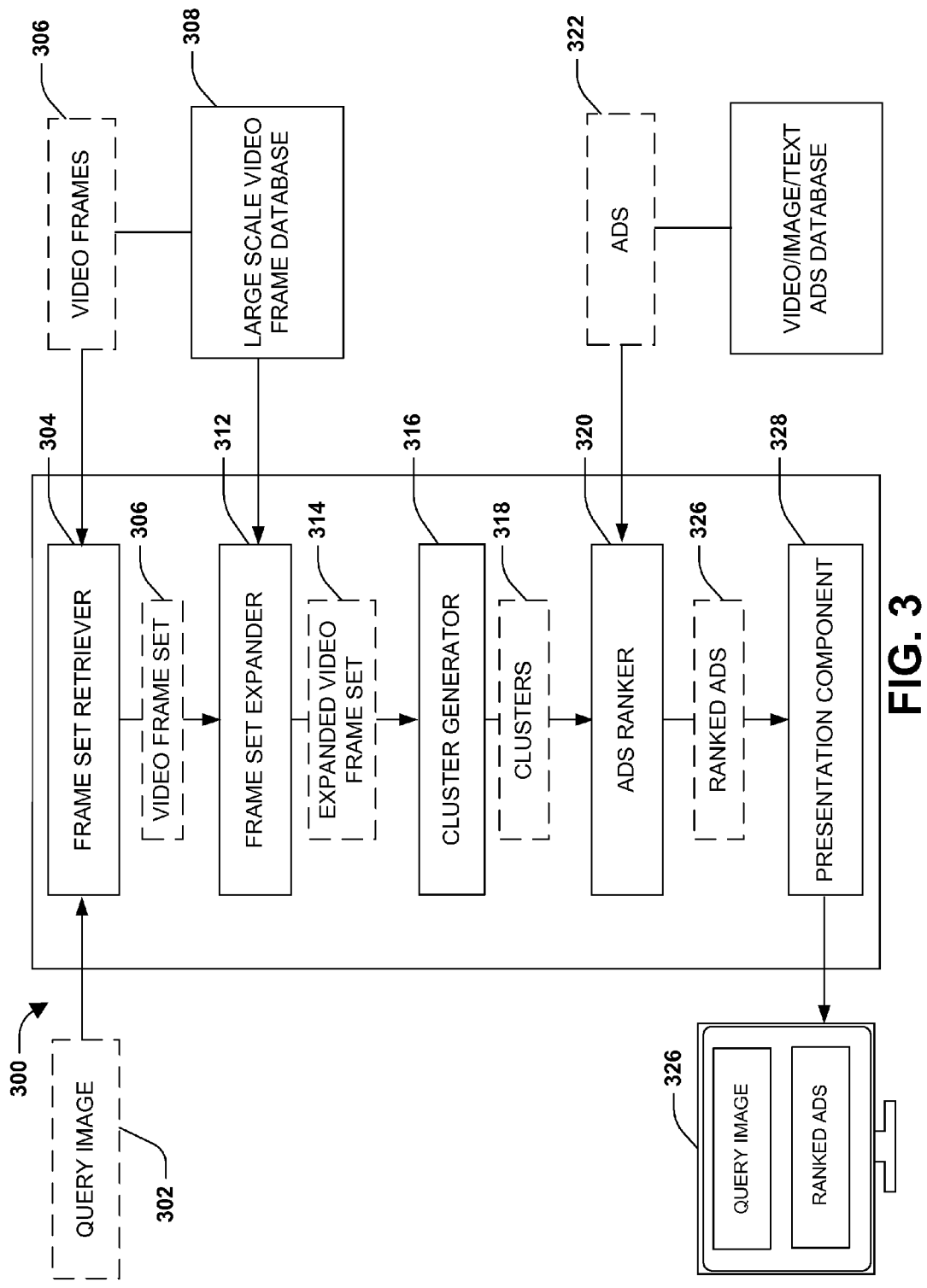
FIG. 3 is a component block diagram illustrating an exemplary system for ranking ads.

FIG. 3 illustrates an example of a system 300 configured for ranking ads 322. The system 300 may comprise a frame set retriever 304, a frame set expander 312, a cluster generator 316, an ad ranker 320, and/or a presentation component 328. The frame set retriever 304 may be configured to retrieve a video frame set 306 based upon a query image 302. The video frame set 306 may comprise one or more video frames 306 retrieved from a large scale video frame database 308. For example, the frame set retriever 304 may extract video frames 306 visually similar and/or semantically similar to the query image 302.

The frame set expander 312 may be configured to expand the video frame set 306 into an expanded video frame set 314 based upon one or more related video frames. For example, the frame set expander 312 may be configured to determine a related video frame based upon the related video frame occurring within a video that also comprises a video frame within the video frame set 306. The cluster generator 316 may be configured to group the expanded video frame set 306 into one or more clusters 318. That is, the cluster generator 316 may generate clusters of similar video frames within the expanded video frame set 306. For example, video frames having similar features may be grouped together in a cluster based upon a multimodal Dirichlet Process Mixture Sets model. The cluster generator 316 may be configured to assign topics to the one or more clusters 318 based upon visual features and/or textual features of the clusters (e.g., features of video frames grouped within a cluster).

The ad ranker 320 may be configured to rank ads 322 based upon the one or more clusters. For example, the ad ranker 320 may be configured to execute a multimodal Dirichlet Process Mixture Sets model upon the ads 322 using the one or more clusters 318. In particular the ad ranker 320 may rank an ad based upon at least some of the ad corresponding to topics assigned to the one or more clusters 318 and/or extracted features of video frames within the one or more clusters 318. The presentation component 328 may be configured to present the ranked ads 326.

Figure 4:
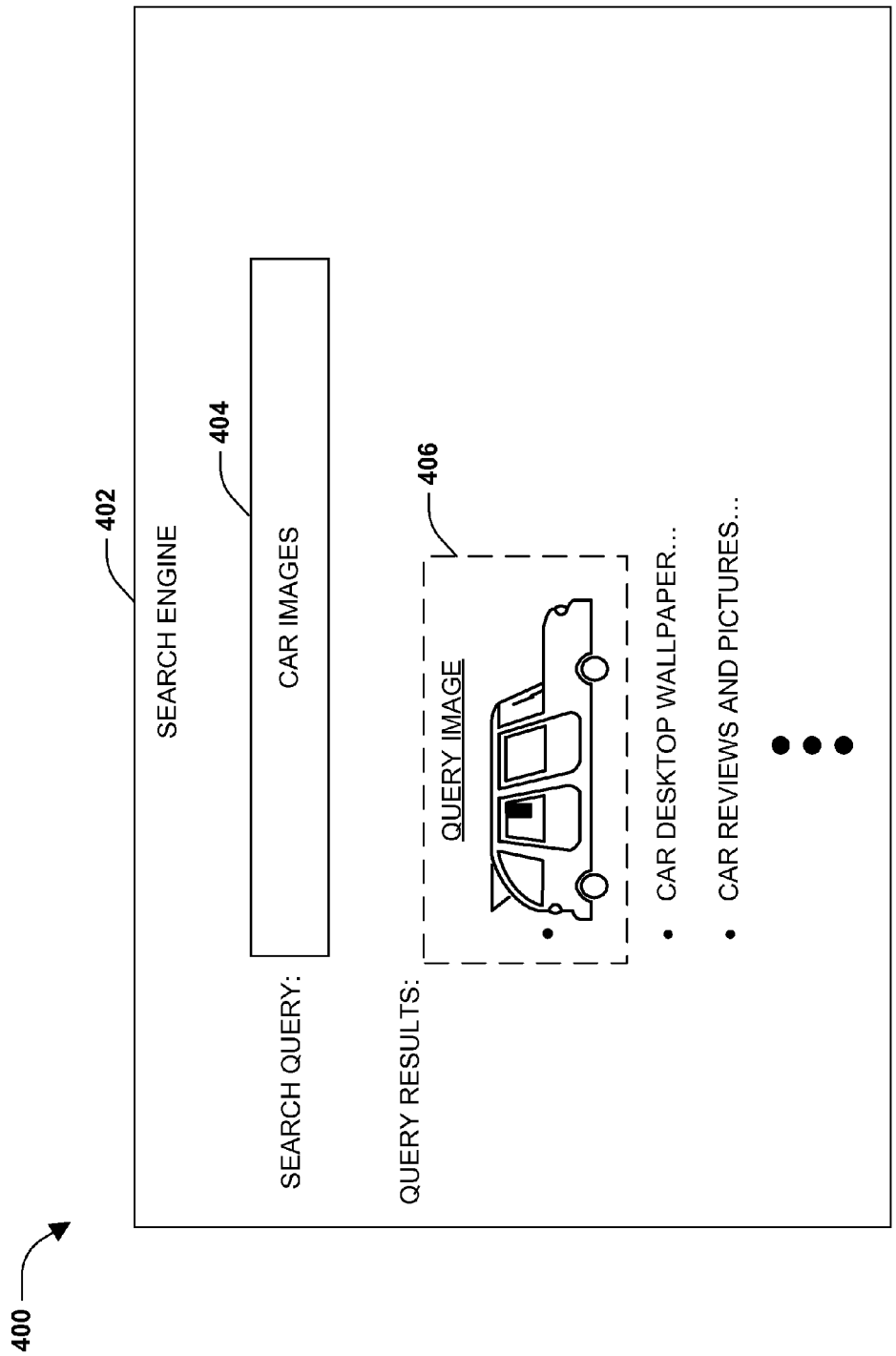
FIG. 4 is an illustration of an example of search engine query results of a search query.

FIG. 4 illustrates an example 400 of search engine query results of a search query 404. A user may submit the search query 404 "car images" into a search engine 402. The search engine 402 may return a plethora of search engine query results. For example, a query image 406 of a car, a hyperlink to a web page of car desktop wallpaper, a descriptive summary of car reviews and pictures, and/or other internet content may be returned. The search engine query results may be internet content relevant to the search query 404 "car images".

The query image 406 of a car may be "worth a thousand words" when determining additional content that the user may find interesting. For example, the query image 406 may be used to determine advertisements that either directly relate to the query image 406 (e.g., other car models, car pricing, etc.) and/or adjacent marketing advertisements that indirect relate to the query image 406 (e.g., tires, insurance, loans, etc.). Unfortunately, many current advertising techniques may return advertisements directly related to the query image 406, but may miss out on advertisements of adjacent markets.

Figure 5:
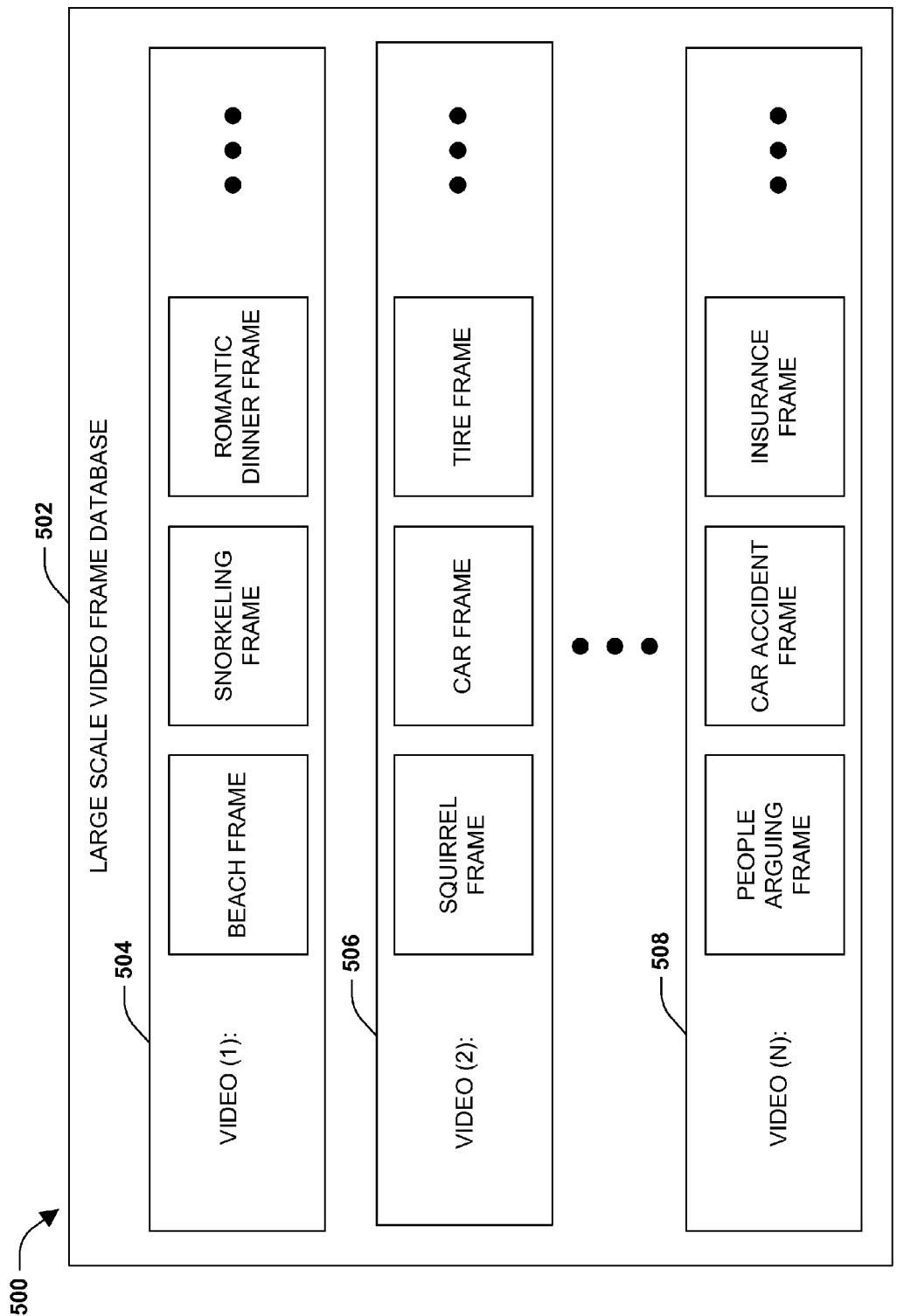
FIG. 5 is an illustration of an example of a large scale video frame database.

FIG. 5 illustrates an example 500 of a large scale video frame database 502. The large scale video frame database 502 may comprise one or more video frames (e.g., a beach frame, a snorkeling frame, a romantic dinner frame, a squirrel frame, a car frame, a tire frame, a people arguing frame, etc.) that may be associated with one or more videos (e.g., video (1) 504, video (2) 506, video (N) 508). For example, video (1) 504 (a video relating to a vacation) may comprise a beach frame, a snorkeling frame, a romantic dinner frame, and/or other video frames (keyframes). It may be appreciated that video frames within a video may be deemed as related video frames with respect to one another. For example, snorkeling frame, romantic dinner frame, and beach frame may be deemed as related video frames with respect to one another because the three video frames are comprised within video (1) 504.

Figure 6:
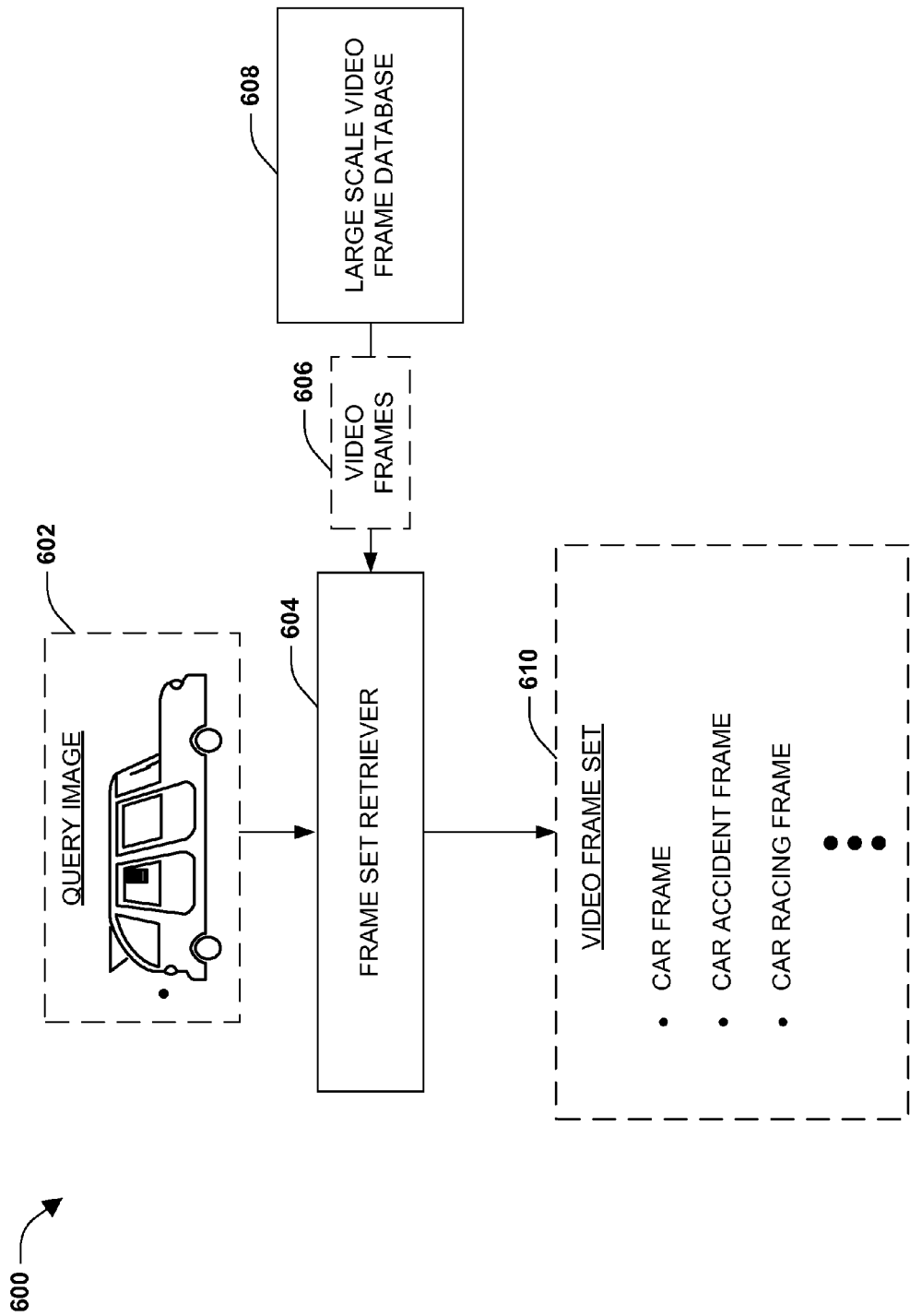
FIG. 6 is an illustration of an example of retrieving a video frame set based upon a query image.

FIG. 6 illustrates an example 600 of retrieving a video frame set 610 based upon a query image 602. A frame set retriever 604 may be configured to retrieve the video frame set 610 based upon the query image 602 (e.g., the query image 406 depicting car in FIG. 4). The frame set retriever 604 may be configured to extract video frames 606 from a large scale video frame database 608. In particular, the frame set retriever 604 may be configured to extract video frames 606 having similar visual, semantically, textual, and/or descriptive features as the query image 602. For example, the query image 602 may have a feature of a car. The frame set retriever 604 may extract a car frame, a car accident frame, a car racing frame, and/or other frames having similar features to the car feature of the query image 602.

Figure 7:
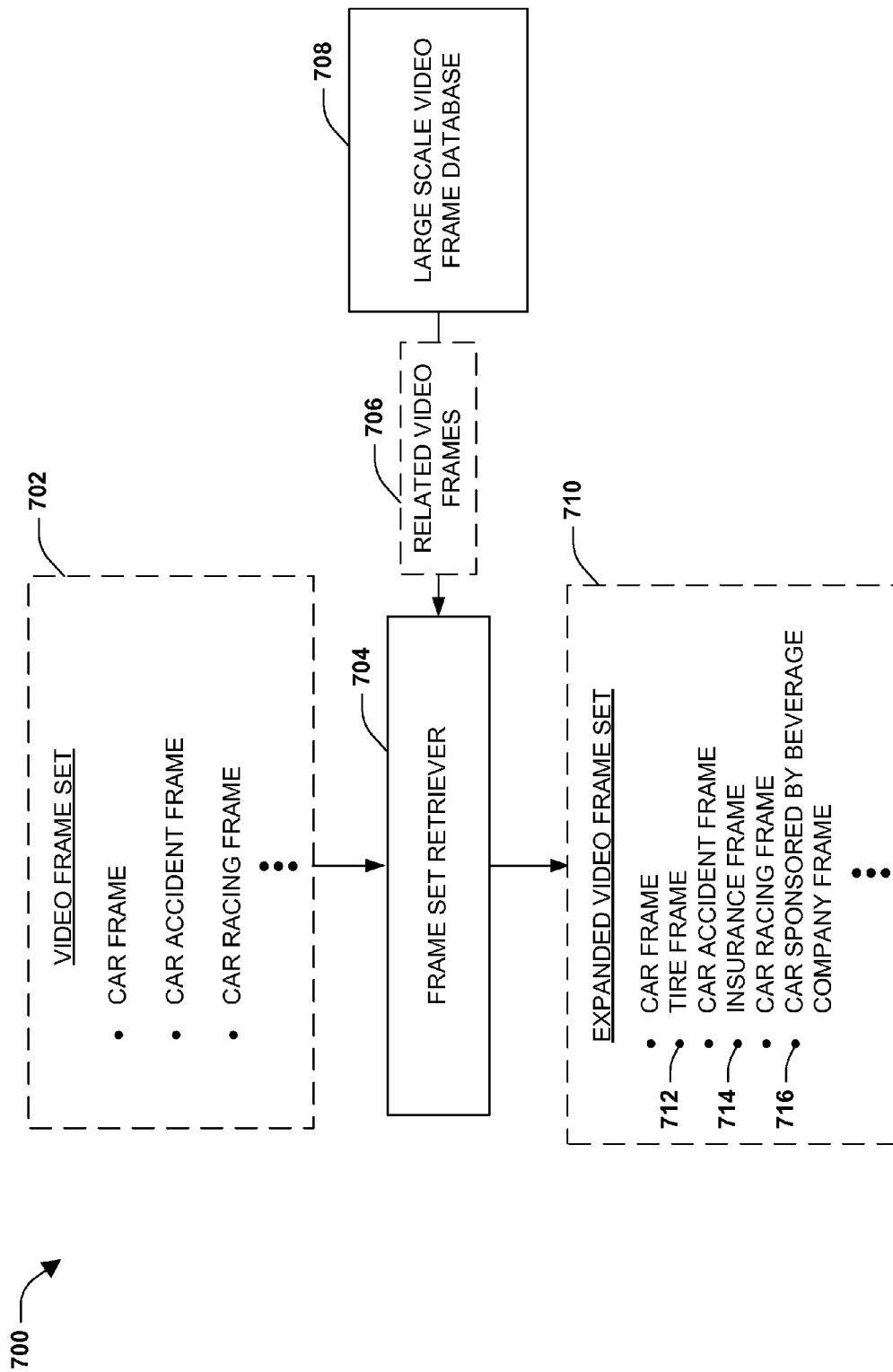
FIG. 7 is an illustration of an example of expanding a video frame set into an expanded video frame set.

FIG. 7 illustrates an example 700 of expanding a video frame set 702 into an expanded video frame set 710. A frame set retriever 704 may be configured to expand the video frame set 702 (e.g., the video frame set 610 of FIG. 6) with related video frames 706. The frame set retriever 704 may be configured to extract the related video frames 706 from a large scale video frame database 708. In particular, the frame set retriever 704 may be configured to extract related video frames 706 occurring within videos comprising video frames within the video frame set 702.

In one example, the video frame set 702 may comprise a car video frame, a car accident video frame, a car racing video frame, and/or other video frames. The frame set retriever 704 may determine a tire video frame 712 may correlate to the car video frame within the video frame set 702 (e.g., the tire video frame 712 and the car video frame may be a part of the same video). Thus, the tire video frame 712 may be determined as a related video frame. An insurance video frame 714 may be determined as a related video frame because the insurance video frame 714 may correlate to the car accident video frame within the video frame set 702 (e.g., the insurance video frame 714 and the car accident video frame may be a part of the same video). A race car sponsored by a beverage company video frame 716 may be determined as a related video frame because the race car sponsored by a beverage company video frame 716 may correlate to the race racing frame within the video frame set 702 (e.g., the race car sponsored by a bever-age company video frame 716 and the car racing video frame may have similar features). The expanded video frame set 710 may comprise the video frames and at least some of the related video frames.

Figure 8:
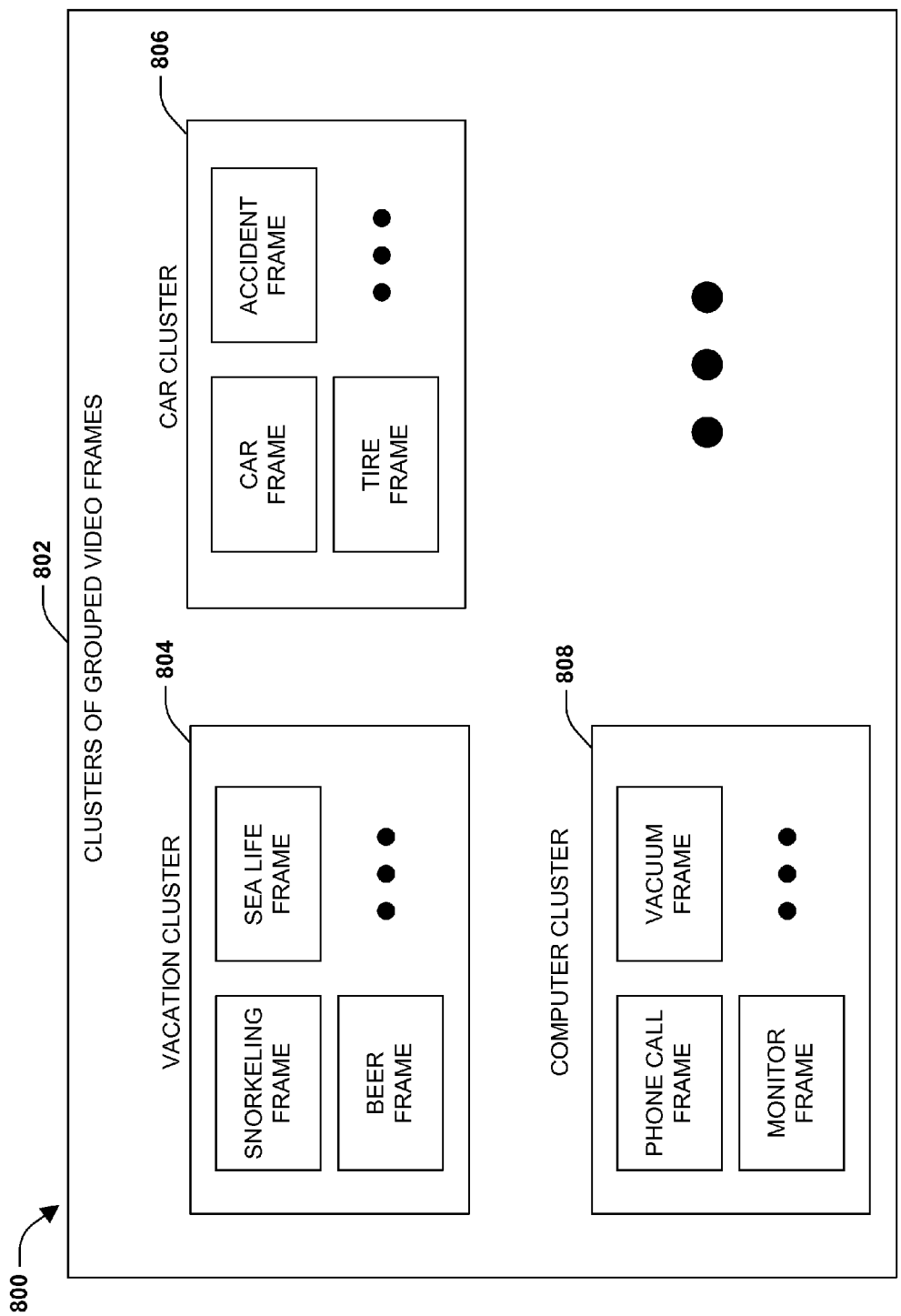
FIG. 8 is an illustration of an example of video frames grouped into clusters.

FIG. 8 illustrates an example 800 of video frames grouped into clusters 802. It may be appreciated that the video frames grouped within the clusters 802 may have been part of an expanded video frame set (e.g., the expanded video frame set 710 of FIG. 7). It may be appreciated that the term video frames within the expanded video frame set may correspond to both video frames and related video frames within the expanded video frame set.

In one example, the expanded video frame set may comprise a snorkeling frame, a sea life frame, a beer frame, a car frame, a tire frame, an accident frame, a phone call frame, a vacuum frame, a monitor frame, and/or a plethora of other video frames. The clusters 802 may be defined based upon features of the expanded video frame set (e.g., visual and/or textual features of the video frames within the expanded video frame set). For example, a vacation cluster 804 may be defined based upon extracted features of swimming, drinking, marine life, water activities, resorts, etc. In this way, video frames having similar features as the vacation cluster 804 may be grouped within the vacation cluster 804 (e.g., snorkeling frame, sea life frame, beer frame, etc.). A car cluster 806 may be defined based upon extracted features of tires, cars, accidents, insurance, car wash, etc. In this way, video frames having similar features as the car cluster 806 may be grouped within the car cluster 806 (e.g., car frame, accident frame, tire frame, etc.). A computer cluster 808 may be defined based upon extracted features of mobile phone, peripherals, video cards, appliances, etc. In this way, video frames having similar features as the computer cluster 808 may be grouped within the computer cluster 808 (e.g., a phone call frame, a vacuum frame, a monitor frame, etc.). The clusters 802 comprise groupings of video frames having similar features.

Figure 9:
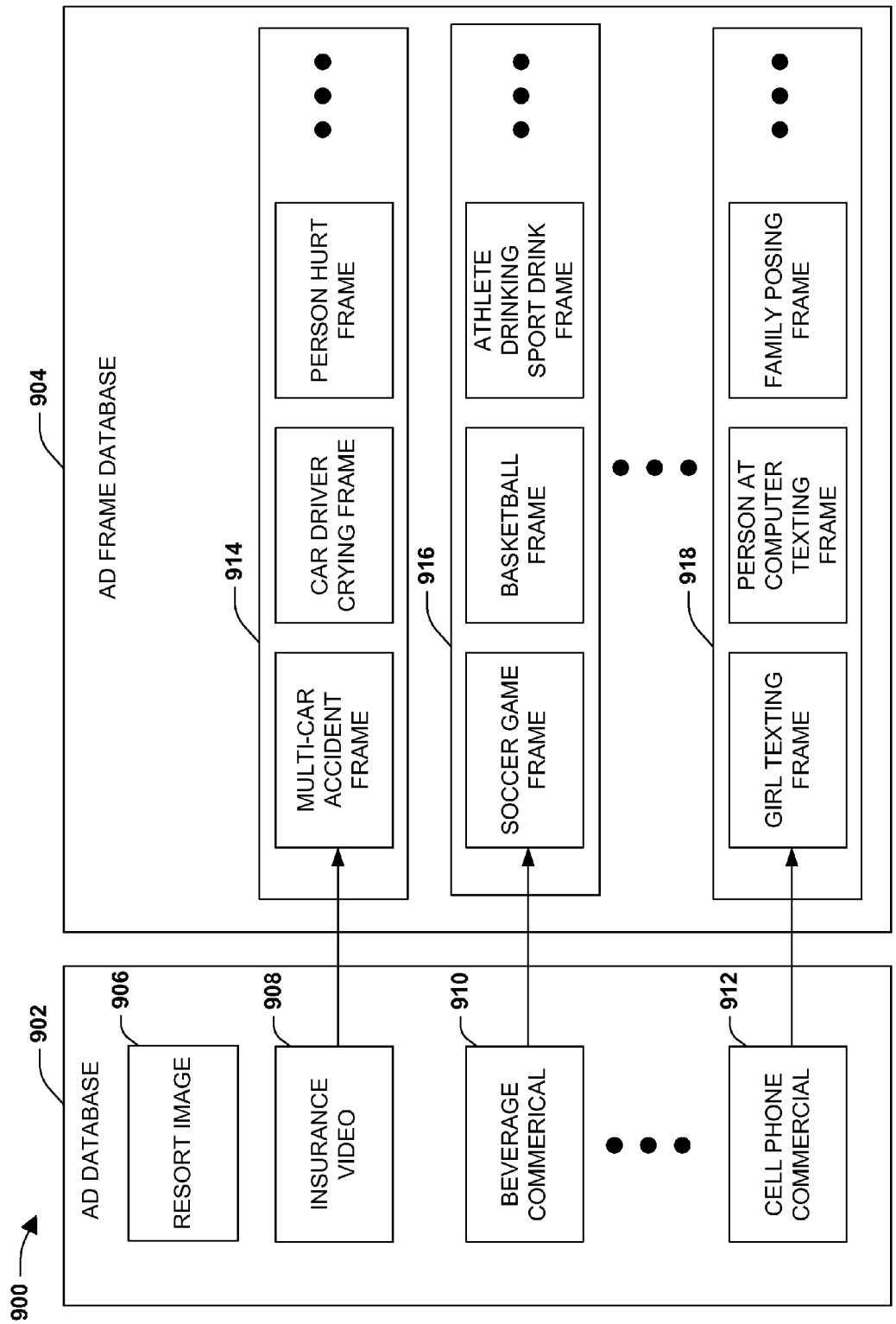
FIG. 9 is an illustration of an example of an ad database and an ad frame database.

FIG. 9 illustrates an example 900 of an ad database 902 and an ad frame database 904. It may be appreciated that the ad database 902 and the ad frame database 904 may be in separate or the same databases. The ad database 902 may comprise a wide variety of advertisements. It may be appreciated that the ad database 902 may comprise video advertisements, image advertisements, textual advertisements, application based advertisements, audio advertisements, and/or other forms of advertisements. For example, the ad database 902 may comprise a resort image ad 906, an insurance video ad 908, a beverage commercial 910, a cell phone commercial 912, and/or other ads.

The ads within the ad database 902 may comprise features, such as visual (e.g., color descriptors), textual, and/or descriptive (e.g., annotated data) features that may be extracted. The extracted features of the ads may be compared with features of clusters and/or video frames within clusters to determine similarity/relevancy between the ads and a query image associated with the clusters of video frames. For example, a multimodal Dirichlet Process Mixtures Sets model may be used to compare the ads with the clusters. In this way, ads within the ad database 902 may be ranked based upon how interesting an ad may be to a user viewing the query image. It may be appreciated that higher ranked ads may be advantageous to present to a user viewing the query image because the user may be interested in the subject matter of the higher ranked ads due to a high correlation between the higher ranked ads and the query image.

Because ads may be in a video format, ad frames may be extracted, stored, and/or annotated within the ad frame database 904. For example, insurance video ad frames 914 may be associated with the insurance video ad 908. That is, the insurance video ad 908 may comprise insurance video ad frames 914 of a multi-car accident, a car driver crying, a person hurt, and/or other ad frames representing keyframes of the insurance video ad 908. The beverage commercial frames 916 may be associated with the beverage commercial 910. That is, the beverage commercial 910 may comprise beverage commercial frames 916 of a soccer game, a basketball game, an athlete drinking a sports drink, and/or other ad frames representing keyframes of the beverage commercial 910. The cell phone commercial frames 918 may be associated with the cell phone commercial 912. That is, the cell phone commercial 912 may comprise cell phone commercial frames 918 of a girl texting, a person at a computer texting, a family posing, and/or other ad frames representing keyframes of the cell phone commercial 912.

Figure 10:
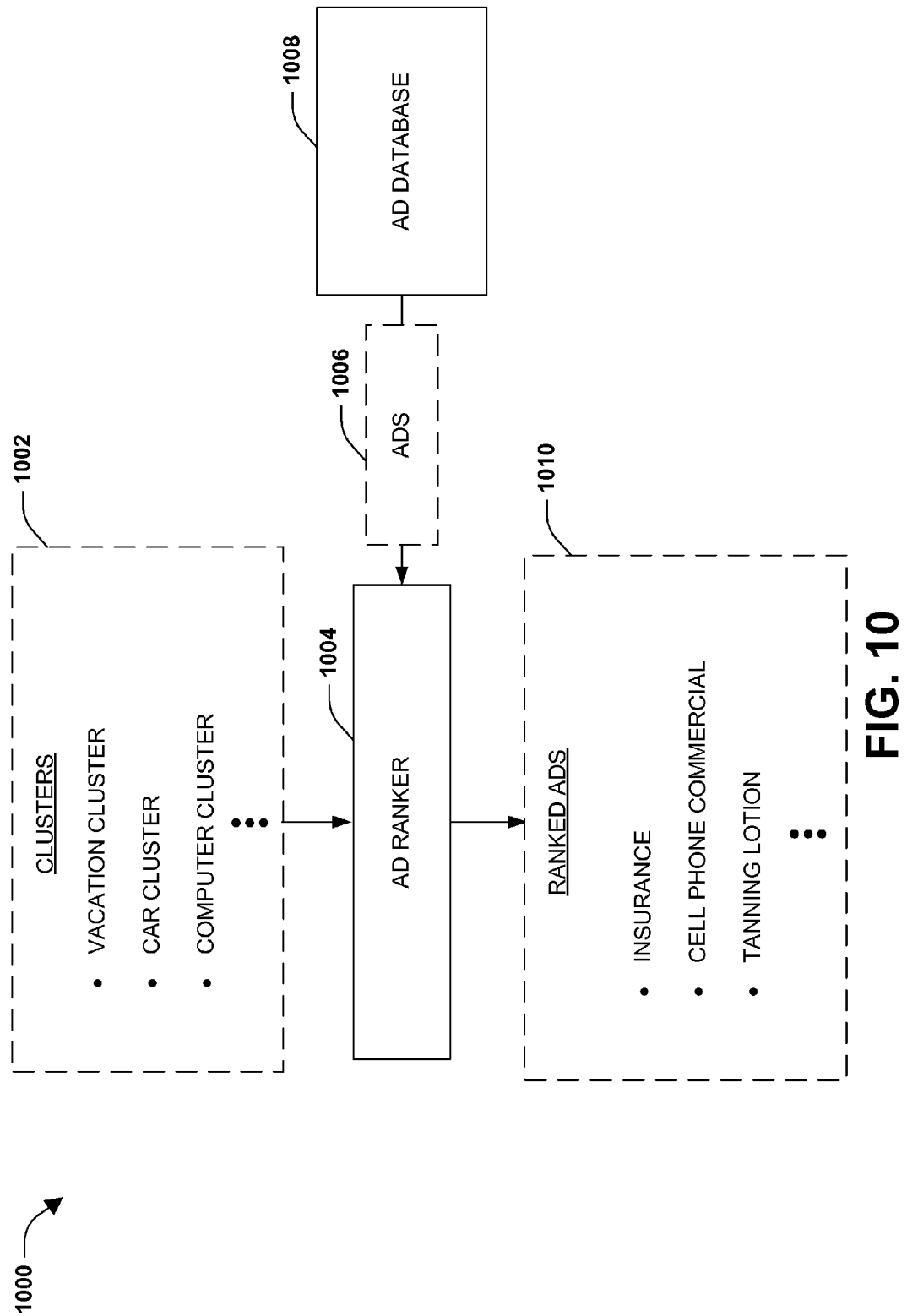
FIG. 10 is an illustration of an example of ads ranked using clusters.

FIG. 10 illustrates an example 1000 of ranked ads 1010 ranked using clusters 1002. The clusters 1002 may comprise one or more clusters of video frames (video frames and expanded video frames) corresponding to a query image. For example, the clusters 1002 may comprise a vacation cluster, a car cluster, a computer cluster, and/or other clusters of video frames. An ad ranker 1004 may be configured to rank ads 1006 within an ad database 1008 based upon the clusters 1002. For example, the ad ranker 1004 may compare features of an ad within the ad database 1008 to features of the clusters 1002 and/or features of video frames grouped within the clusters. In this way, ads having similar features as the clusters 1002 and/or video frames may be ranked higher than ads lacking features similar to the clusters 1002 and/or video frames. For example, the ad ranker 1004 may implement a multimodal Dirichlet Process Mixture Sets model to determine ad rankings.

In one example, the ad ranker 1004 may rank hundreds of ads 1006 within the ad database 1008. For example, an insurance ad may be ranked high because the insurance ad may have features similar to the clusters 1002, such as the car cluster. A cell phone commercial may be ranked high because the cell phone commercial may have features similar to the clusters 1002, such as the computer cluster. A tanning lotion ad may be ranked medium/high because the tanning lotion ad may have features similar to the clusters 1002, such as the vacation cluster. A dish detergent ad may be ranked low because the dish detergent ad may not have features similar to features within the clusters 1002. In this way, ads 1006 may be ranked based upon the clusters 1002 and/or video frames within the clusters. It may be appreciated that a variety of ranking methods are contemplated as falling within the claimed subject matter (e.g., 0 to 1, 0 to 100, low to high, etc.).

Figure 11:
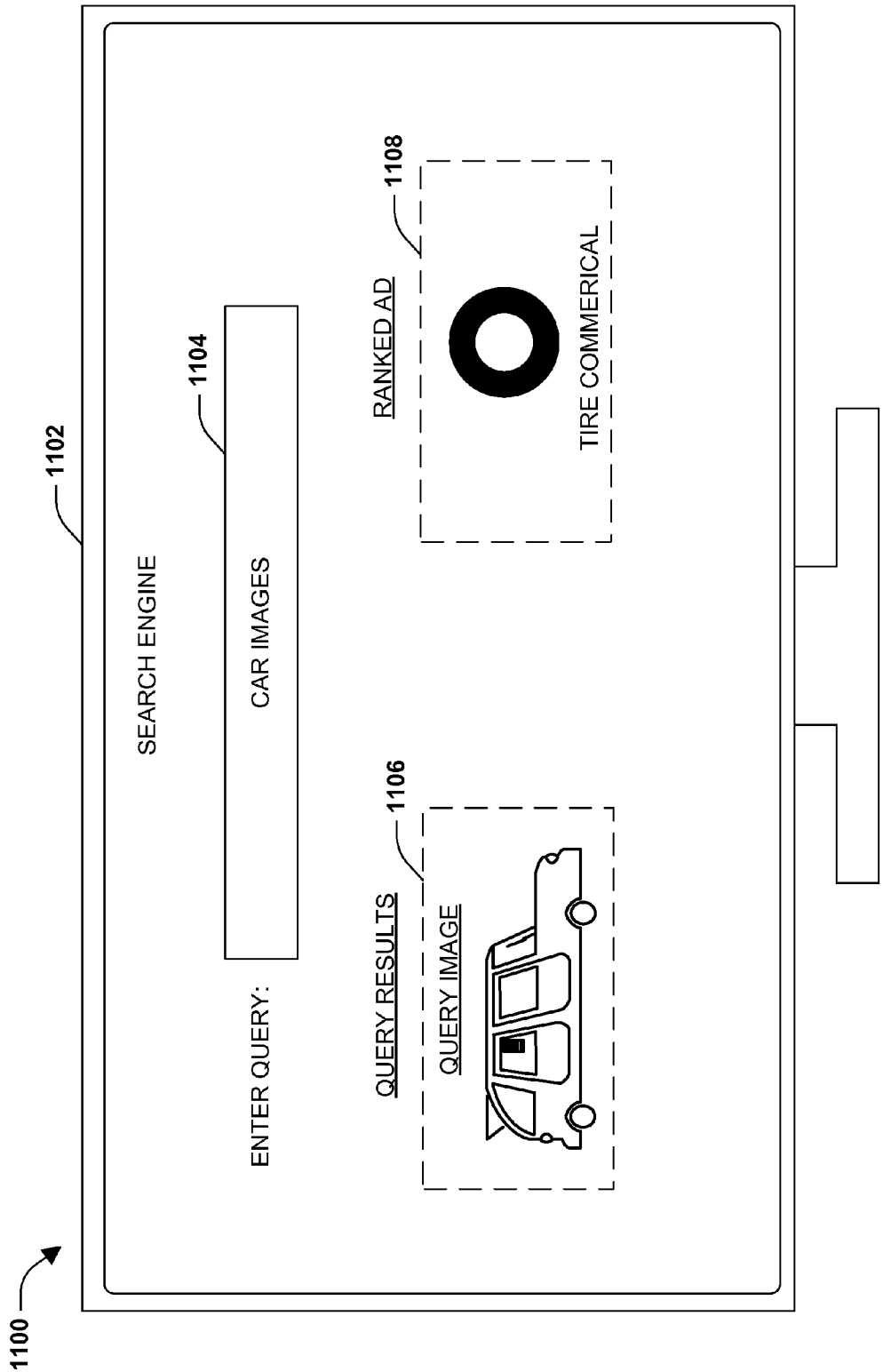
FIG. 11 is an illustration of an example of presenting one or more ranked ads.

FIG. 11 illustrates an example 1100 of presenting one or more ranked ads. It may be appreciated that a ranked ad may comprise a video advertisement, a text advertisement, an image advertisement, an audio advertisement, and/or other types of advertisements. In one example, a user may submit a query 1104 "car images" to a search engine 1102. The search engine 1102 may return query results, such as a query image 1106 of a car. The query image 1106 may be used to retrieve a video frame set comprising video frames relating to the query image 1006. The video frame set may be expanded with related frames (frames relating to the video frames within the video frame set), which may correlate to adjacent marketing subject matter. The video frames within the expanded video frame set may be grouped into clusters of similar features. In particular, clusters may be defined based upon features of video frames within the expanded video frame set. Video frames may be grouped into corresponding clusters, such that video frames within a cluster may have similar features with respect to one another and the cluster.

Ads may be ranked based upon how similar ads are to the clusters. Ads similar to the features of a cluster may be ranked high, while ads lacking similar features may be ranked low. For example, a tire commercial 1108 may be ranked high because features of the tire commercial 1108 (e.g., tire, car, and/or other features) may relate to features of video frames grouped within clusters associated with the query image 1106. The tire commercial 1108 may be presented to a user engaged with the search engine 1102.

Figure 12:
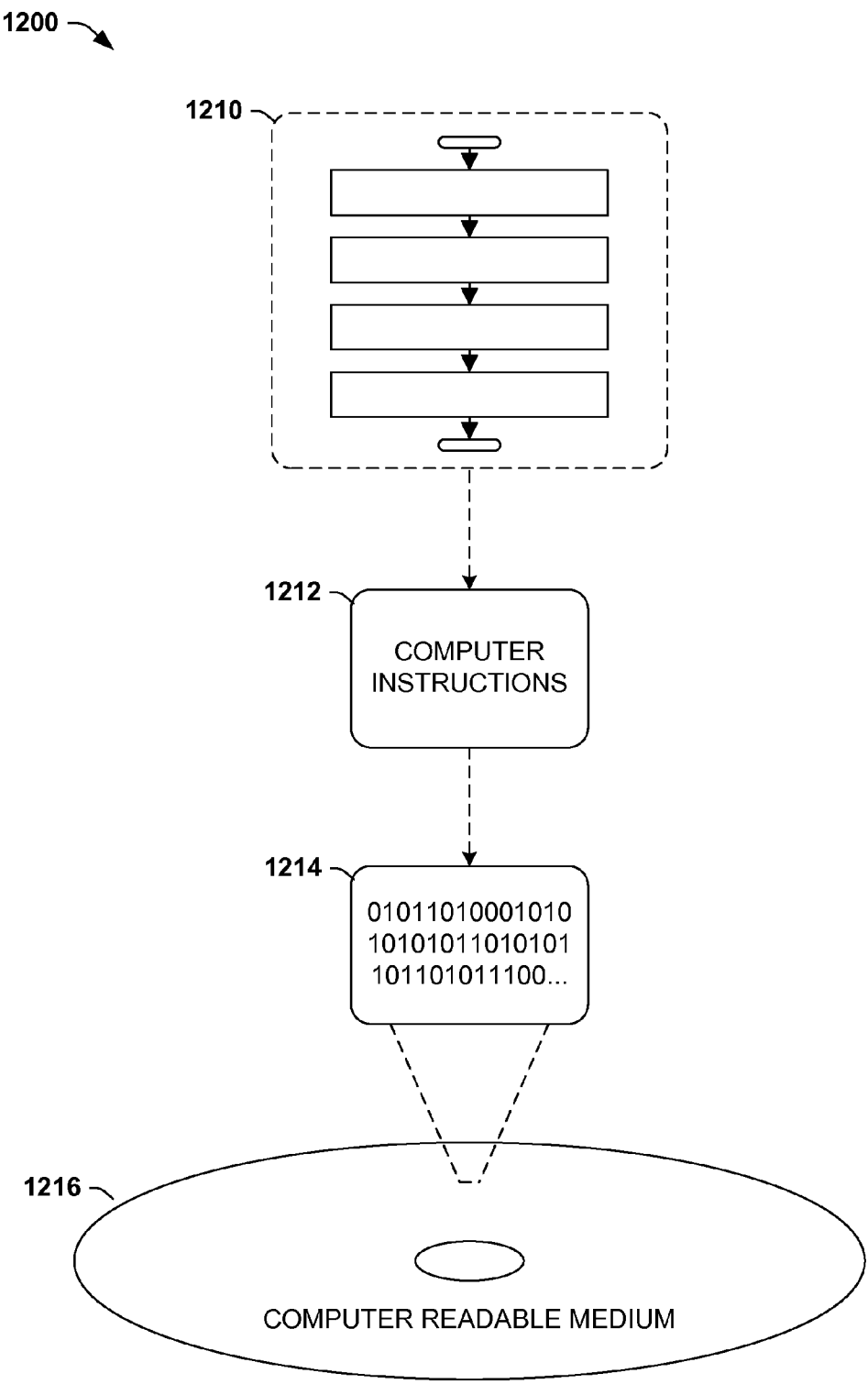
FIG. 12 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 12, wherein the implementation 1200 comprises a computer-readable medium 1216 (e.g., a CD-R, DVD-R, or a platter of a hard disk drive), on which is encoded computer-readable data 1214. This computer-readable data 1214 in turn comprises a set of computer instructions 1212 configured to operate according to one or more of the principles set forth herein. In one such embodiment 1200, the processor-executable computer instructions 1212 may be configured to perform a method 1210, such as the exemplary method 100 of FIG. 1 and/or exemplary method 200 of FIG. 2, for example. In another such embodiment, the processor-executable instructions 1212 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
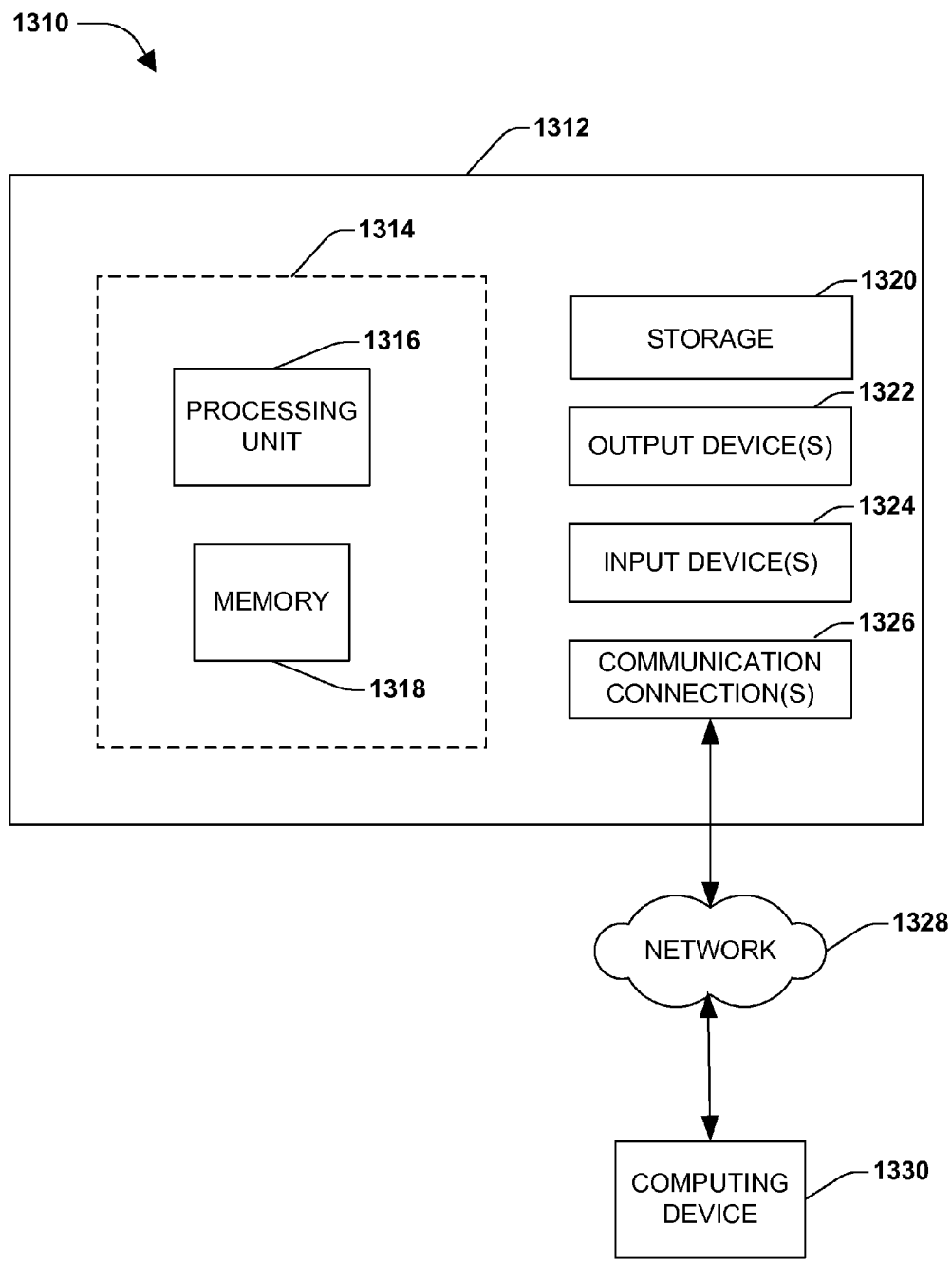
FIG. 13 illustrates an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1310 comprising a computing device 1312 configured to implement one or more embodiments provided herein. In one configuration, computing device 1312 includes at least one processing unit 1316 and memory 1318. Depending on the exact configuration and type of computing device, memory 1318 may be volatile (such as RAM, for example), non-volatile (such as ROM, flash memory, etc., for example) or some combination of the two. This configuration is illustrated in FIG. 13 by dashed line 1314.

In other embodiments, device 1312 may include additional features and/or functionality. For example, device 1312 may also include additional storage (e.g., removable and/or non-removable) including, but not limited to, magnetic storage, optical storage, and the like. Such additional storage is illustrated in FIG. 13 by storage 1320. In one embodiment, computer readable instructions to implement one or more embodiments provided herein may be in storage 1320. Storage 1320 may also store other computer readable instructions to implement an operating system, an application program, and the like. Computer readable instructions may be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1312 may include input device(s) 1324 such as keyboard, mouse, pen, voice input device, touch input device, infrared cameras, video input devices, and/or any other input device. Output device(s) 1322 such as one or more displays, speakers, printers, and/or any other output device may also be included in device 1312. Input device(s) 1324 and output device(s) 1322 may be connected to device 1312 via a wired connection, wireless connection, or any combination thereof. In one embodiment, an input device or an output device from another computing device may be used as input device(s) 1324 or output device(s) 1322 for computing device 1312.

Components of computing device 1312 may be connected by various interconnects, such as a bus. Such interconnects may include a Peripheral Component Interconnect (PCI), such as PCI Express, a Universal Serial Bus (USB), firewire (IEEE 13134), an optical bus structure, and the like. In another embodiment, components of computing device 1312 may be interconnected by a network. For example, memory 1318 may be comprised of multiple physical memory units located in different physical locations interconnected by a network.

Those skilled in the art will realize that storage devices utilized to store computer readable instructions may be distributed across a network. For example, a computing device 1330 accessible via a network 1328 may store computer readable instructions to implement one or more embodiments provided herein. Computing device 1312 may access computing device 1330 and download a part or all of the computer readable instructions for execution. Alternatively, computing device 1312 may download pieces of the computer readable instructions, as needed, or some instructions may be executed at computing device 1312 and some at computing device 1330.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for ranking an ad, comprising:
    retrieving an initial video frame set comprising one or more initial video frames based upon a query image;
    identifying one or more related video frames related to at least one initial video frame of the initial video frame set to create an expanded video frame set comprising one or more video frames, the one or more video frames of the expanded video frame set comprising at least some initial video frames and at least some related video frames, the expanded video frame set not comprising the query image;
    grouping at least some of the one or more video frames of the expanded video frame set into one or more clusters; and
    ranking an ad based upon an ad feature of the ad corresponding to a cluster feature of a cluster, at least some of at least one of the retrieving, the identifying, the grouping, or the ranking implemented at least in part via a processing unit.

2. The method of claim 1, the identifying one or more related video frames comprising:
    identifying a related video frame comprising a first feature corresponding to a second feature of an initial video frame.

3. The method of claim 2, the query image not associated with the first feature.

4. The method of claim 1, the identifying one or more related video frames comprising:
    identifying a related video frame based upon the related video frame occurring within a video comprising an initial video frame.

5. The method of claim 1, the grouping comprising:
    defining a cluster based upon one or more features extracted from the expanded video frame set.

6. The method of claim 1, the grouping comprising:
    executing a multimodal Dirichlet Process Mixture Sets model upon the expanded video frame set to define a cluster.

7. The method of claim 1, the retrieving an initial video frame set comprising:
    obtaining an initial video frame that is visually similar to the query image.

8. The method of claim 1, the retrieving an initial video frame set comprising:
    obtaining an initial video frame that is textually similar to the query image.

9. The method of claim 1, the retrieving an initial video frame set comprising:
    retrieving an initial video frame from a large scale video frame database based upon matching a query image feature of the query image with a feature of the initial video frame.

10. The method of claim 1, comprising:
    ranking one or more ads based upon the one or more clusters to create a set of ranked ads.

11. The method of claim 10, comprising:
    presenting a ranked ad from the set of ranked ads based upon a rank of the ranked ad.

12. The method of claim 1, the ranking an ad comprising:
    ranking one or more ad frames of the ad.

13. The method of claim 1, the ranking comprising:
    executing a multimodal Dirichlet Process Mixture Sets model upon the ad using the one or more clusters.

14. A system for ranking an ad, comprising:
    a frame set retriever configured to:
        retrieve an initial video frame set comprising one or more initial video frames based upon a query image, the initial frame set not comprising the query image;
    a frame set expander configured to:
        identify one or more related video frames related to at least one initial video frame of the initial video frame set to create an expanded video frame set comprising one or more video frames, the one or more video frames of the expanded video frame set comprising at least some initial video frames and at least some related video frames;
    a cluster generator configured to:
        group at least some of the one or more video frames of the expanded video frame set into one or more clusters; and
    an ad ranker configured to:
        rank an ad based upon an ad feature of the ad corresponding to a cluster feature of a cluster, at least some of at least one of the frame set retriever, the frame set expander, the cluster generator, or the ad ranker implemented at least in part via a processing unit.

15. The system of claim 14, the frame set expander configured to:
    identify a related video frame comprising a first feature corresponding to a second feature of an initial video frame, the query image not associated with the first feature.

16. The system of claim 14, the frame set expander configured to:
    identify a related video frame based upon the related video frame occurring within a video comprising an initial video frame.

17. The system of claim 14, comprising:
    a presentation component configured to:
        present the ad based upon a rank assigned to the ad.

18. The system of claim 14, the cluster generator configured to:
   execute a multimodal Dirichlet Process Mixture Sets model upon the expanded video frame set to define a cluster.

19. The system of claim 14, the ad ranker configured to:
   execute a multimodal Dirichlet Process Mixture Sets model upon the ad using the one or more clusters.

20. A computer-readable device comprising processor-executable instructions that when executed perform a method for ranking an ad, comprising:
   retrieving an initial video frame set comprising one or more initial video frames based upon a query image;
   identifying one or more related video frames, not comprising the query image, related to at least one initial video frame of the initial video frame set to create an expanded video frame set comprising one or more video frames, the one or more video frames of the expanded video frame set comprising at least some initial video frames and at least some related video frames;
   grouping at least some of the one or more video frames of the expanded video frame set into one or more clusters; and
   ranking an ad based upon an ad feature of the ad corresponding to a cluster feature of a cluster.

* * * * *